US006398469B1

(12) United States Patent
Bain

(10) Patent No.: US 6,398,469 B1
(45) Date of Patent: Jun. 4, 2002

(54) APPARATUS FOR VARYING ROUTER FENCES

(76) Inventor: William J. Bain, 8595 Jared Way, Boca Raton, FL (US) 33433

(*) Notice: Subject to any disclaimer, the term of this patent is extended or adjusted under 35 U.S.C. 154(b) by 0 days.

(21) Appl. No.: 09/772,614

(22) Filed: Jan. 30, 2001

(51) Int. Cl.[7] .............................. B23C 9/00; B27C 1/12; B27G 23/00

(52) U.S. Cl. ..................................... 409/218; 144/253.2

(58) Field of Search ................................. 409/218, 235; 144/253.2, 135.2, 253.1; 269/304, 310, 315, 316, 320

(56) References Cited

U.S. PATENT DOCUMENTS

| | | | | |
|---|---|---|---|---|
| 727,337 A | | 5/1903 | Forster | |
| 1,947,885 A | * | 2/1934 | Tautz | 144/253.2 |
| 2,104,158 A | * | 1/1938 | Hedgpeth | 144/253.2 |
| 3,991,991 A | * | 11/1976 | Hammer | 269/318 |
| 4,186,784 A | | 2/1980 | Stone | |
| 4,304,276 A | * | 12/1981 | Termini | 144/253.2 |
| 4,593,590 A | * | 6/1986 | Gray | 83/438 |
| 4,719,951 A | * | 1/1988 | Woltanski | 144/253.2 |
| 4,787,614 A | | 11/1988 | Givens | |
| 5,016,693 A | * | 5/1991 | Haffely et al. | 044/253.2 |
| 5,042,542 A | | 8/1991 | Purviance | |
| 5,771,767 A | * | 6/1998 | Itami | 83/435.13 |

* cited by examiner

*Primary Examiner*—William Briggs

(57) ABSTRACT

A router table has a flat top having a horizontal surface, and a router fence assembly on the horizontal surface. A router is mounted below the flat top table and has a vertically upstanding rotatably powered bit extending through a router bit opening in the flat top. A flat top has a pivotal section pivotally mounted on the flat top to close an access opening therein. A router is rigidly secured to a lower surface of the pivotal section and has an elongated router bit extending upwardly therefrom through a router bit opening. The router fence is pivotally secured to the flat top for horizontal pivotal motion to eliminate any interference with upwardly pivotal movement of the pivotal section. The router fence has infeed and outfeed portions having a connecting mechanism slidably joining the portions to permit one portion to be slidably diagonally moved with respect to the other.

5 Claims, 8 Drawing Sheets

APPARATUS FOR VARYING ROUTER FENCES

BACKGROUND OF THE INVENTION

Varying the operating positions of infeed and outfeed fences for use on a router table is often a difficult, time-consuming and sometimes inaccurate task for conventional router tables. The fences may need to be perfectly aligned to create a precisely straight edge on a work piece. The fences also may need to be slightly offset with respect to the router bit and with each other when the router bit is to make a special cut of material from the edge of a work piece. This is normally conducted in conjunction with a horizontal table top wherein the upstanding router is mounted on the underneath side of the table top with the router bit protruding through an opening and projecting above the level of the table top to perform its task. Changing bits on the router is also often difficult and inefficient, and sometimes requires disassembly of certain components.

It is therefore a principal object of this invention to provide a method and apparatus for varying router fences which is easily set up and which is extremely precise.

A further object of the invention is to provide a method and apparatus for varying router fences wherein the router fence assembly can be easily moved to an inoperative position to permit router bits to be changed.

It is a still further object of this invention to provide a method and apparatus for varying router fences wherein the router does not need to be disassembled in any respect and can be pivoted to a service position above the level of the router table with a minimum of effort.

These and other objects will be apparent to those skilled in the art.

SUMMARY OF THE INVENTION

A router table has a flat top having a horizontal surface, and a router fence assembly pivotally mounted on the horizontal surface. A router is mounted below the flat top table and has a vertically upstanding rotatably powered bit extending through a router bit opening in the flat top.

The flat top has a pivotal section pivotally mounted thereon to close an access opening therein. A router is rigidly secured to a lower surface of the pivotal section and is adapted to have an elongated router bit extending upwardly therefrom through a router bit opening.

The router fence assembly is comprised of infeed and outfeed portions having a connecting mechanism slidably joining the portions to permit one portion to be slidably diagonally moved with respect to the other portion thus assuring parallelism.

DESCRIPTION OF THE PREFERRED EMBODIMENT

Figure 1:
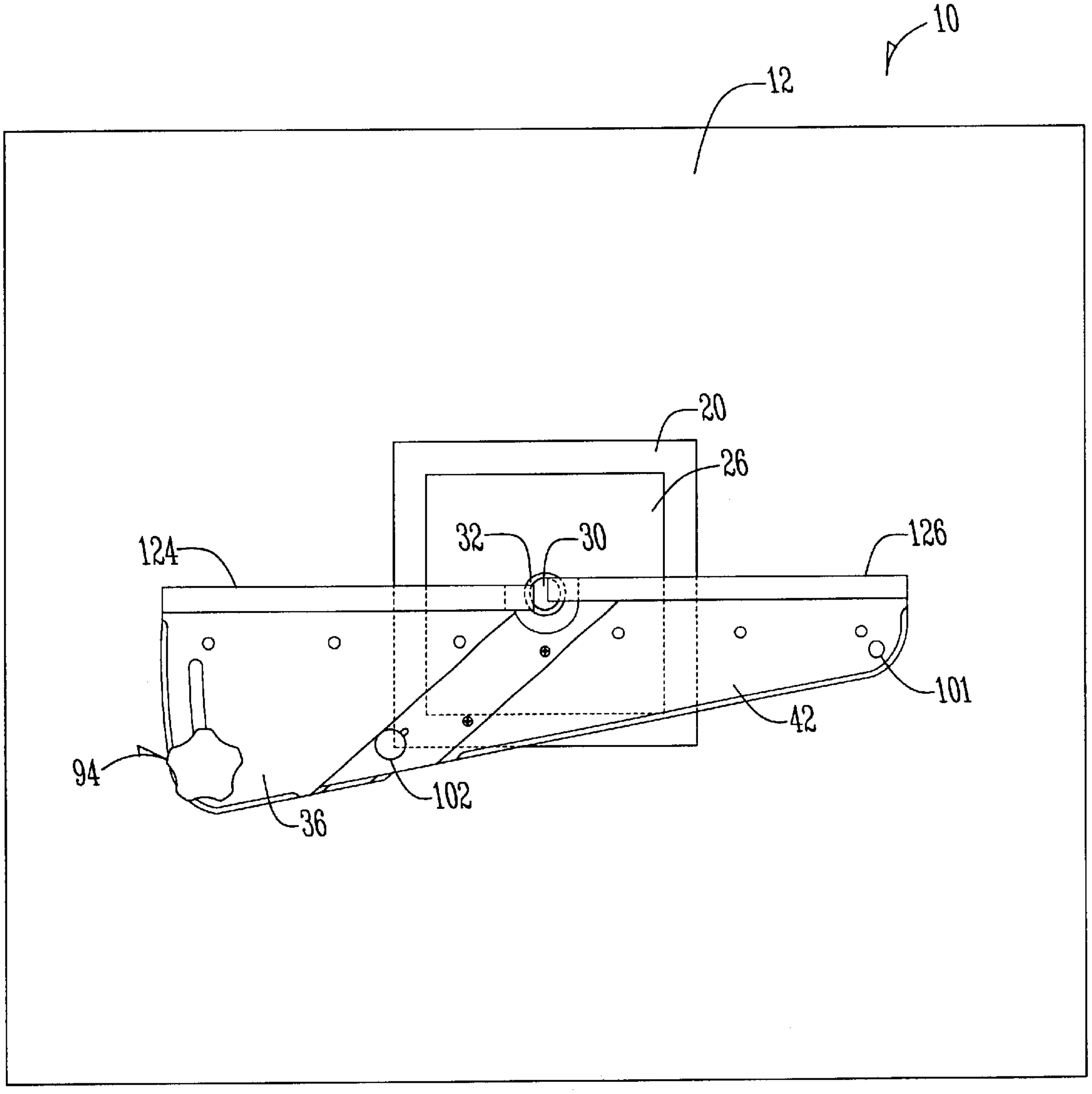
FIG. 1 is a plan view of the instant invention.
Figure 1A:
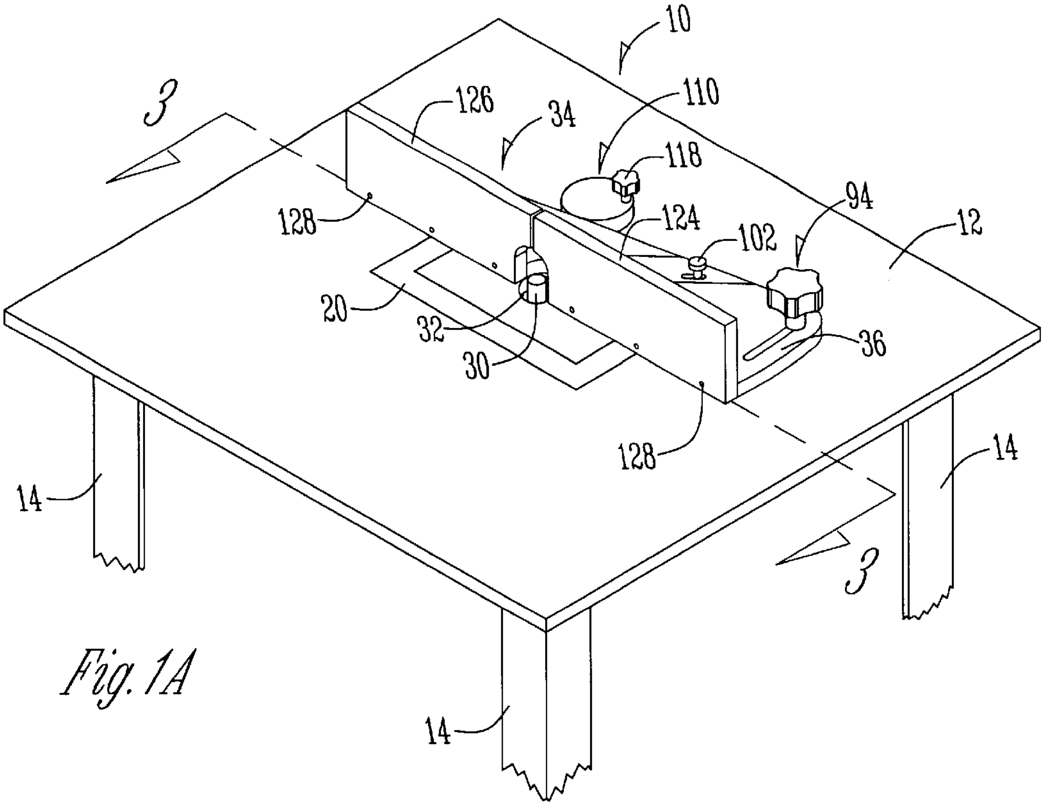
FIG. 1A is a perspective view of the structure of FIG. 1 as seen from the upper side of FIG. 1.
Figure 2:
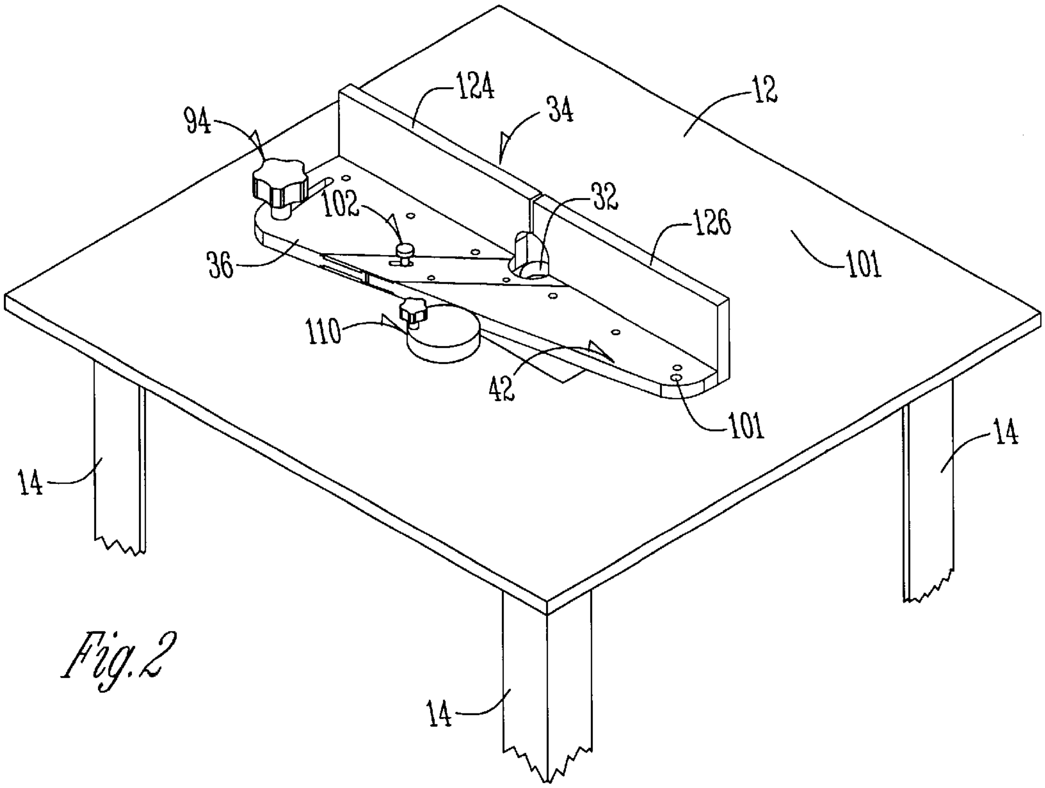
FIG. 2 is a view similar to that of FIG. 1A but is viewed from the bottom side of FIG. 1.
Figure 3:
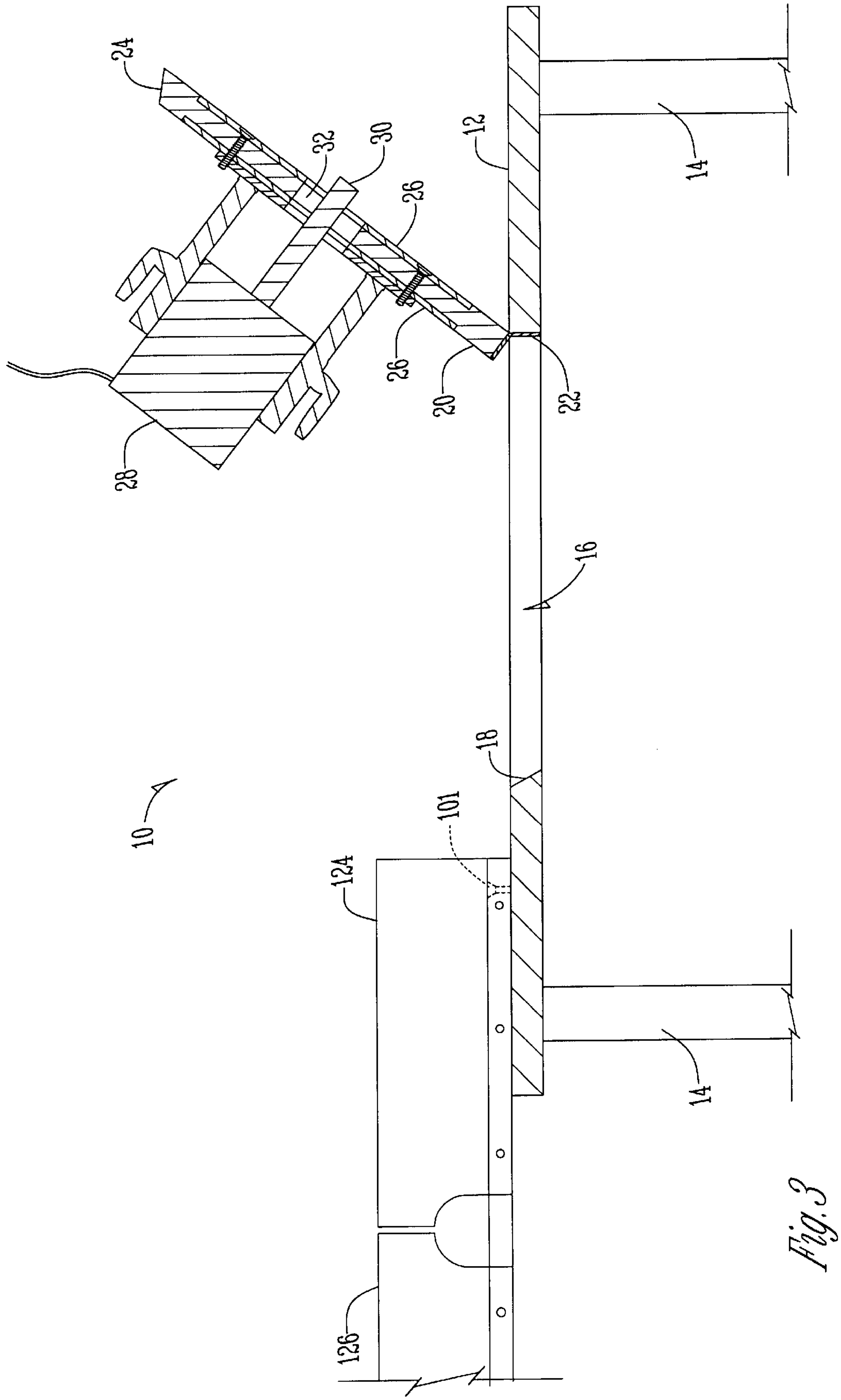
FIG. 3 is an enlarged scale sectional view taken along the axis 3—3 of FIG. 1A but shows the fence assembly and the router in a position for changing the bit on the router.

A router table 10 has a flat top 12 with four conventional legs 14 (FIG. 1*a*). A rectangular access opening 16 (FIG. 3) has a beveled edge 18 on one end, and receives a pivotal section 20 of complimentary shape which is hinged within opening 16 by hinge 22 (FIG. 3). Pivot section 20 has a beveled edge 24 which registers with beveled edge 18 of the access opening to support the section 20 in a horizontal position when the access opening is closed by the section 20 as shown in FIGS. 1, 1A and 2. Mounting plates 26 are mounted on opposite surfaces of the pivotal section 20. The upper plate 26 is recessed and is flush with the top of section 20. A router 28 is bolted by an convenient means to the mounting plates 26 as best shown in FIG. 3. A router bit 30 protrudes from one end of conventional router 28. Bit 30 extends through router bit hole 32 in the section 20.

Figure 9:
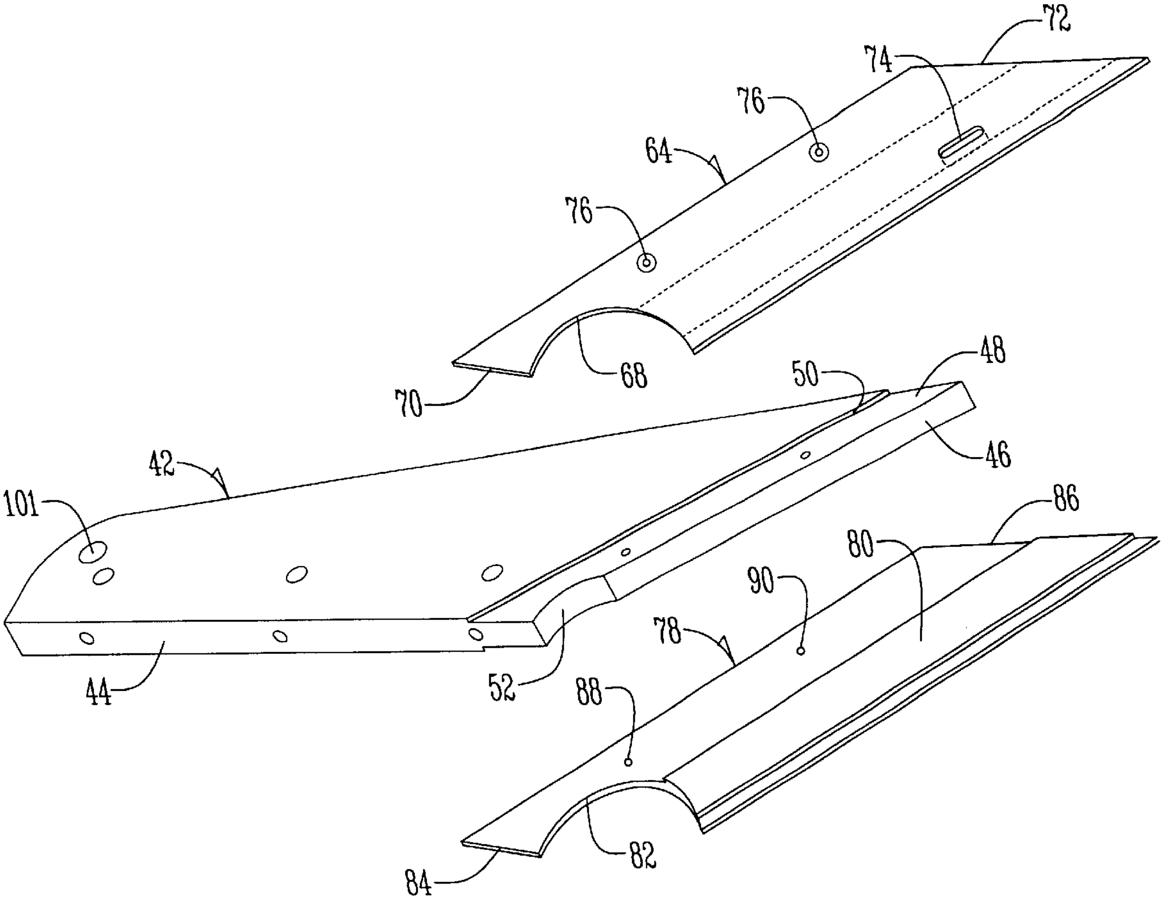
FIG. 9 is an exploded partial perspective view of the outfeed plate.

A router fence assembly 34 includes horizontal infeed plate 36 (FIG. 10) having a straight edge 38 and a diagonally disposed edge 40. Outfeed horizontal plate 42 (FIG. 9) has a straight edge 42 and a diagonal edge 46 which registers with the diagonal edge 40 on plate 36, as will be discussed hereafter. The edge 46 has a horizontal tongue 48 (FIG. 9) of uniform width and thickness. Tongue 48 is bordered on its inboard side by lips 50. One end of the tongue 48 has an arcuate horizontal notch 52 (FIG. 9).

Figure 10:
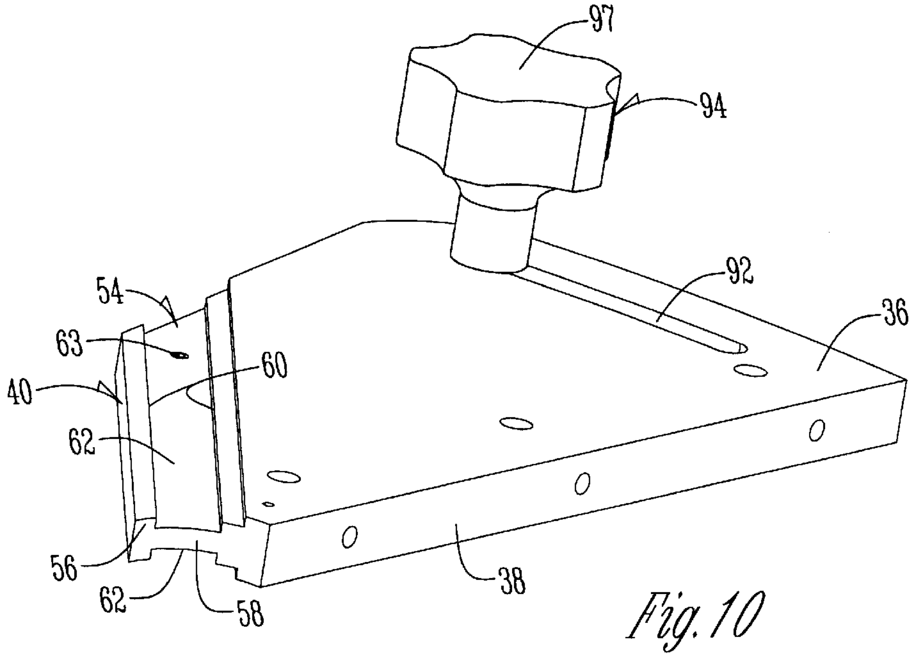
FIG. 10 is a partial perspective view of the infeed plate.

The diagonal edge 40 of the infeed plate 36 has a horizontal T-shaped tongue 54 (FIG. 10) which terminates in vertical tab 56. (FIG. 10). An arcuate notch 58 is located at one end of tongue 54 and is bordered by lips 60 to create channel 62 defined by lips 60 and tab 56. As seen in FIG. 10, opposed channels 62 appear in both the upper and lower surfaces of tongue 54.

Figure 11:
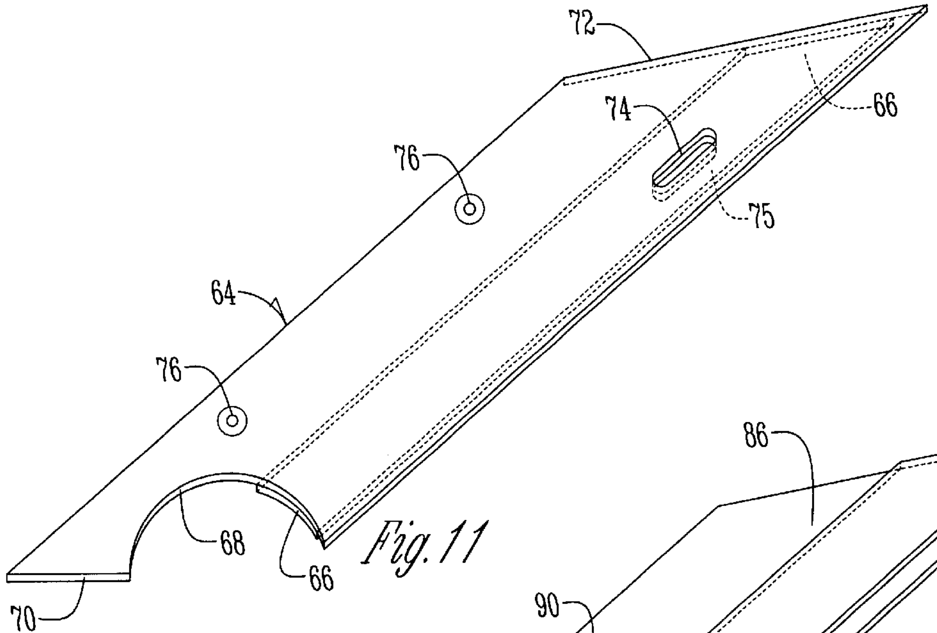
FIG. 11 is a plan view of the top or upper bar that is secured to the diagonal edge of the outfeed plate.
Figure 15:
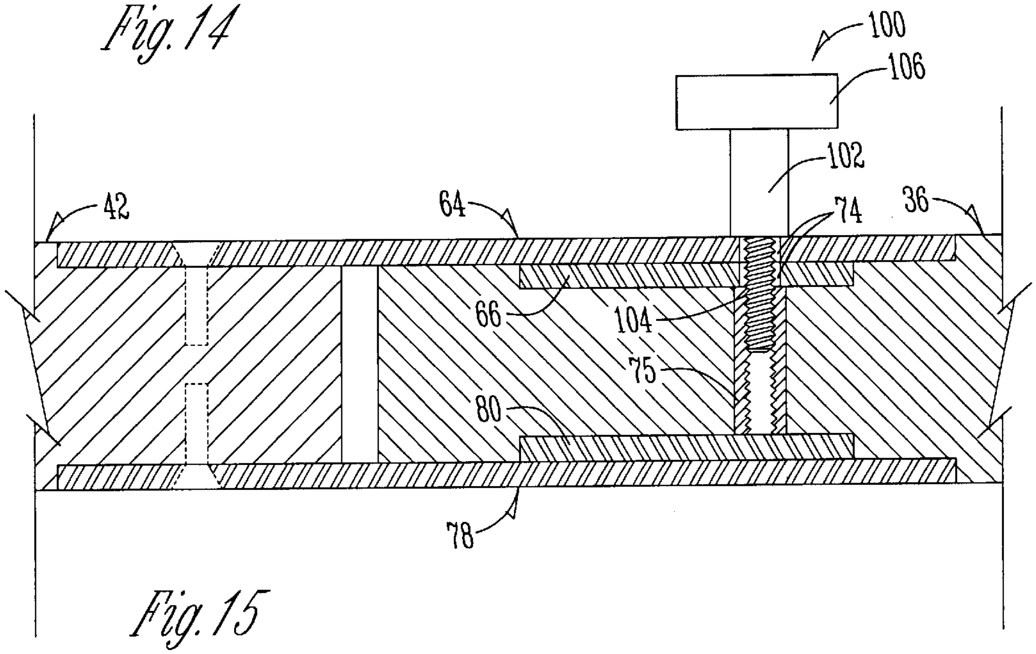
FIG. 15 is a partial sectional view taken on line 15—15 of FIG. 4.

A horizontal top bar 64 (FIG. 11) has a guide bar 66 rigidly fixed thereto in any convenient manner. The guide bar 66 is of a smaller lateral width than is the top bar 64. An arcuate notch 68 is formed at one end of bar 64 and is complimentary in shape to the notch 58 in plate 36. Each of the ends of bar 64 terminate in diagonal edge portions 70 and 72. Registering elongated slots 74 appear in both bars 64 and 66. (FIG. 11). Slots 74 register with threaded bearing 75 in plate 36 which is directly below. (FIG. 15). Mounting holes 76 are provided in bar 64 to permit mounting screws to attach bar 64 to tongue 48 on diagonal edge 46 of outfeed plate 42.

Figure 12:
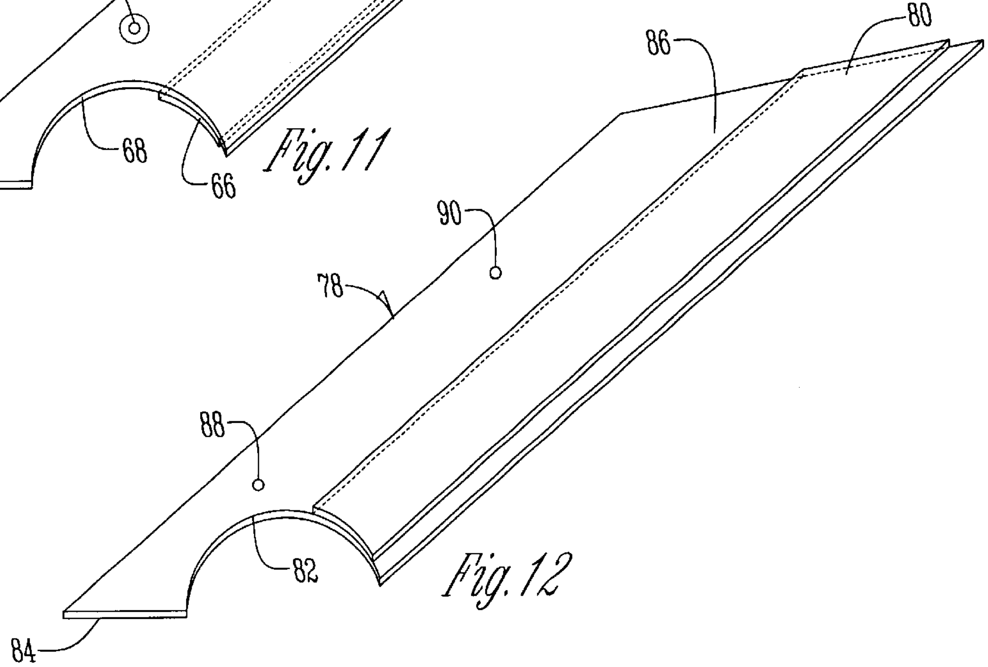
FIG. 12 is a top view of the bottom bar which is secured to the diagonal portion of the infeed plate.
Figure 13:
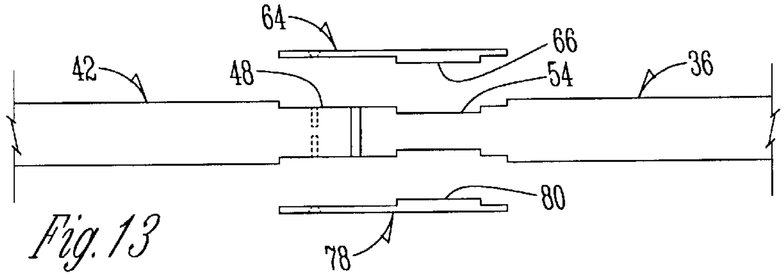
FIG. 13 is an enlarged scale exploded sectional view of the connecting mechanism between the infeed and outfeed plates.
Figure 13A:
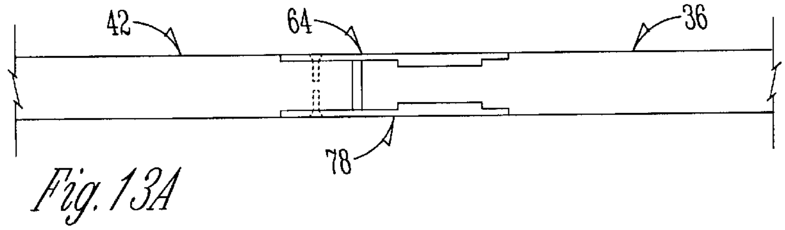
FIG. 13A is a sectional view of the assembled components of FIG. 13 as taken on line 12—12 of FIG. 4.

Horizontal bottom bar 78 is essentially a mirror image of top bar 64 (FIG. 12). Bar 78 has a guide bar 80 which is similar to guide bar 66 on bar 64. Arcuate notch 82 is located in one end of bar 78 and is complementary in shape to the notch 68 in bar 64. Bar 78 has opposite diagonal ends 84 and 86 which are opposite the diagonal ends 70 and 72, respectively, of bar 64.

Mounting holes 88 and 90 are located in bar 78 to receive screws for attaching the bar to the lower portion of tongue 48 of plate 42.

Figure 16:
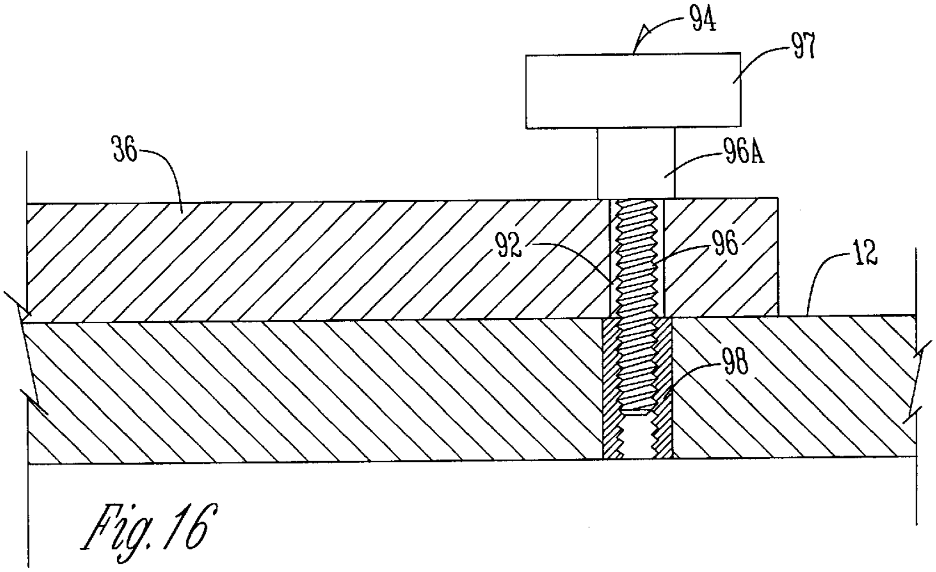
FIG. 16 is a partial sectional view taken on line 16—16 of FIG. 4.

A curved slot 92 is located in infeed plate 36 and a releasable lock 94 is mounted in slot 92 (FIG. 16). Lock 94 includes shank 96 extending from shoulder 96A with a handle 97 on its upper end. The lower end of shank 96 extends through internally threaded bearing 98 mounted in table top 12 after extending through slot 92. The fence assembly 34 is locked to the table top 12 when the handle 97 on the shank 96 is rotated to screw the shank into the bearing 98. Pivotal motion of the fence assembly 34 with respect to the table 12 is accomplished by loosening lock 94 and pivoting the assembly 34 about pivot point 101. (FIGS. 2, 3 and 9). The releasable lock 94 can be completely removed from the assembly by completely disengaging shank 96 from the bearing 98.

A bar lock 100 is used to incrementally fix the slidable diagonal positions of infeed plate 36 and outfeed plate 42. This structure is shown in FIG. 15 wherein a large diameter shoulder 102 has a threaded shank 104 of smaller diameter extending therefrom. The shank 104 extends downwardly through slots 74 in bar 64 and in guide bar 66. When handle 106 is rotated to screw shank 104 downwardly into bearing 75, the shoulder 102 bears against the top of the bar 64 to bind bar 64 firmly together with bearing 75 in plate 36. This locks plates 36 and 42 together and fixes the relative sliding position therebetween. By reversing the rotation of handle 106, the two plates 36 and 42 are free for sliding motion with respect to each other.

Figure 14:
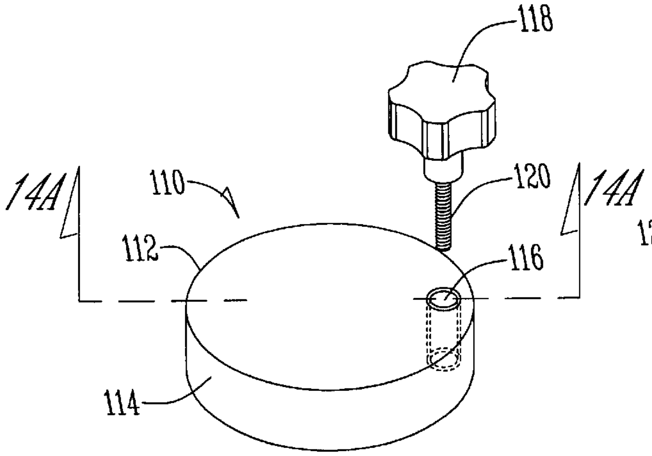
FIG. 14 is a partial perspective view of the micro-cam stop or releasable gauge element.
Figure 14A:
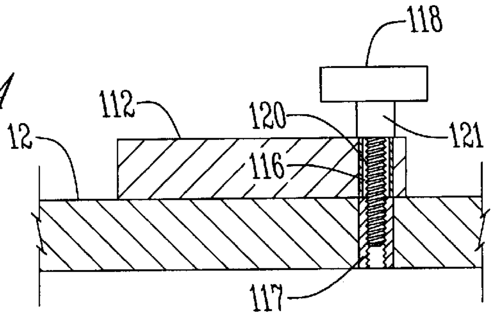
FIG. 14A is a sectional view taken on line 14A—14A of FIG. 14 after the components of FIG. 14 are assembled on a router table.

As shown in FIG. 14, a cam gauge element 110 is located on plate 42 and is comprised of a cam wheel 112 which has a circular peripheral cam surface 114. The wheel 112 is eccentrically mounted in threaded bearings 116 and 117 in wheel 112 and table top 12, respectively. A handle 118 is mounted on cam wheel 112 by threaded stub 120 which is threadably mounted in bearings 116 and 117. By completely screwing stub 120 through bearing 116 and into threaded bearing 117, the lower end of the shoulder 121 will bind the wheel against the top of plate 42 to rigidly hold the cam wheel 112 in an eccentric position. The eccentric position of wheel 112 can be changed by loosening stub 120, moving the wheel, and relocking the stub 120 in bearings 116 and 117.

Figure 8:
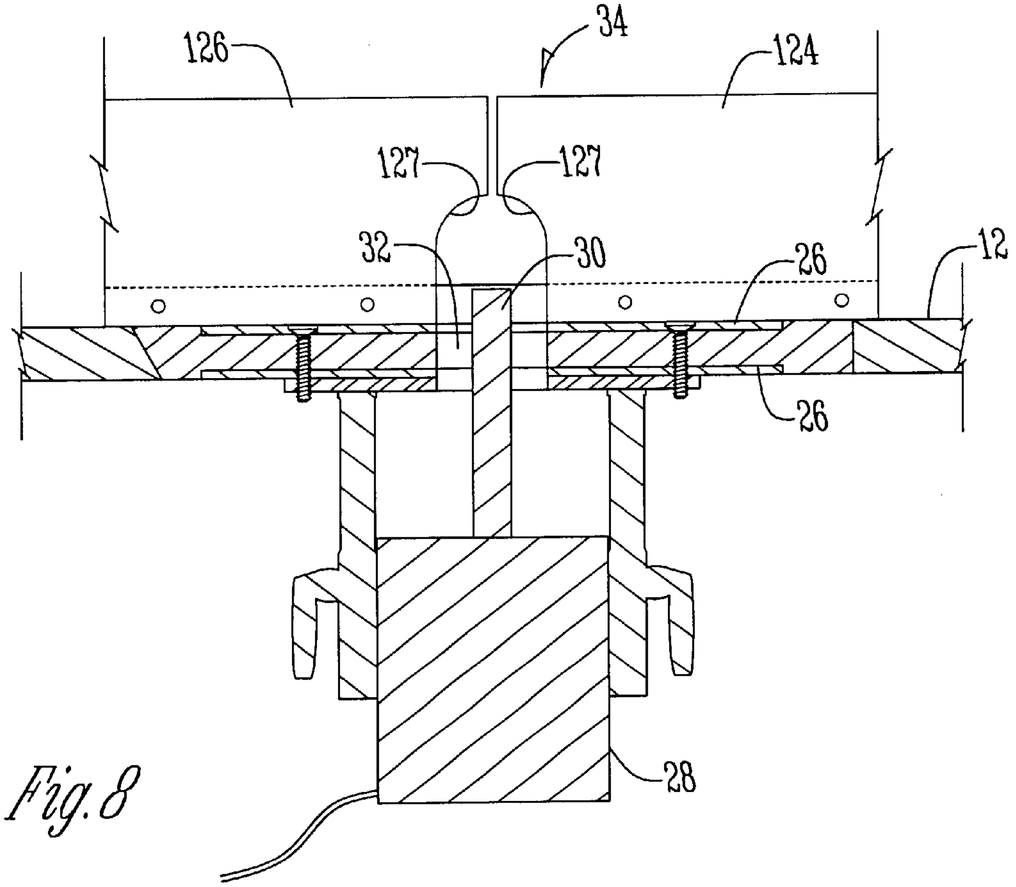
FIG. 8 is a sectional view taken on line 8—8 of FIG. 4.

Infeed and outfeed fences 124 and 126 (FIGS. 1–6) are connected by bolt assemblies 128 (FIG. 1A) to each of the infeed and outfeed plates 36 and 42, respectively. The inner ends of fences 124 and 126 terminate in opposite sides of router bit hole 32 in arcuate slots 127 (FIG. 8). A conventional dust catcher (not shown) is typically mounted adjacent hole 32.

Figure 4:
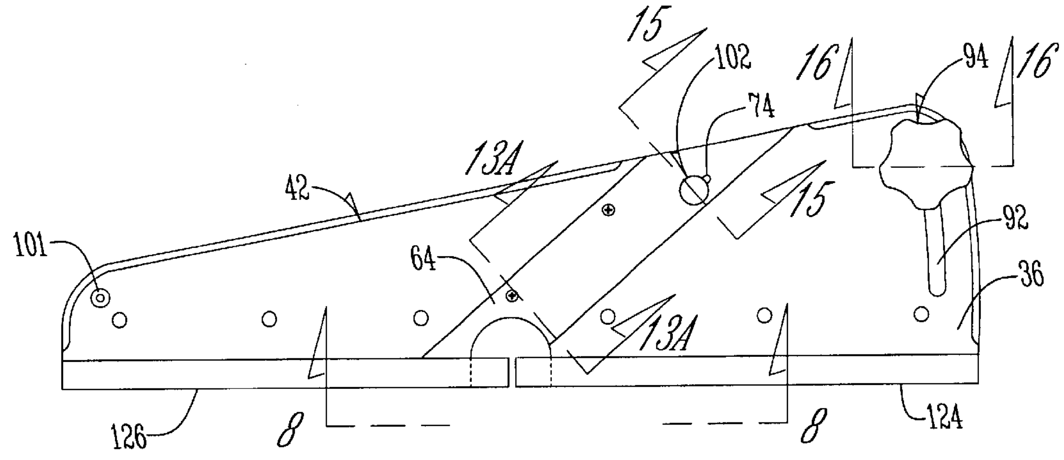
FIG. 4 is an enlarged scale plan view of the router fence assembly with the fence portions being aligned.
Figure 5:
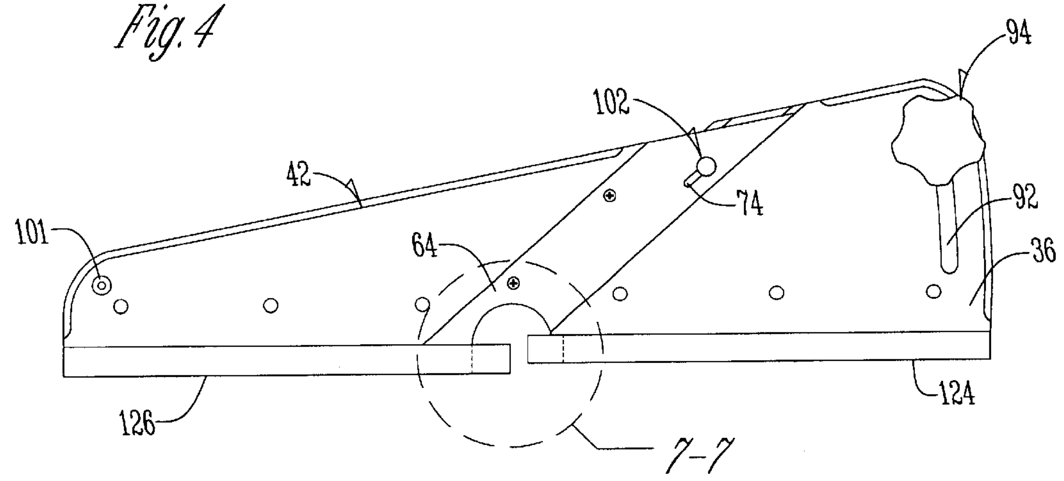
FIG. 5 is a plan view similar to that of FIG. 4 wherein the fence portions are in a state of disalignment.
Figure 6:
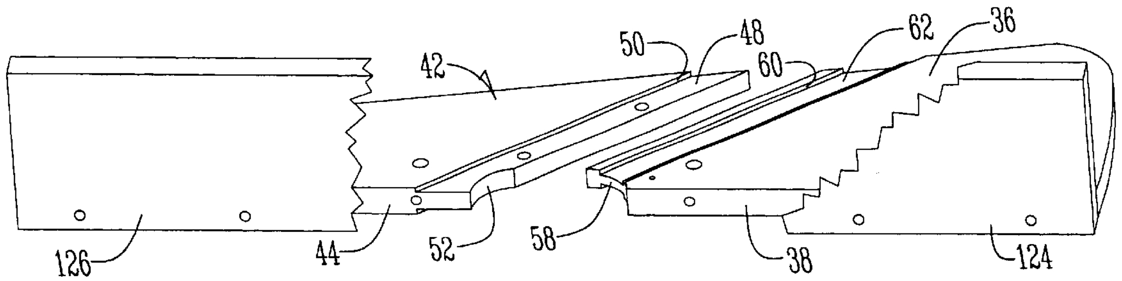
FIG. 6 is a partial top exploded perspective view of the infeed and outfeed plates.
Figure 7:
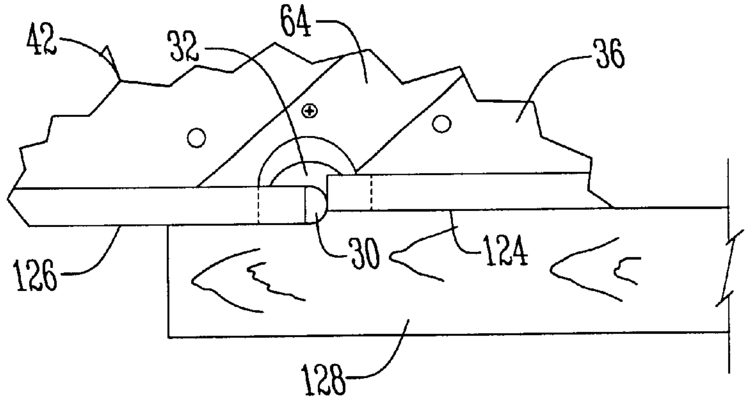
FIG. 7 is a partial plan view taken on line 7—7 of FIG. 5.

In operation, the router fence assembly is pivotally mounted on table top 12 by means of pivot pin 101 which extends through one end of outfeed plate 52 (see FIGS. 1 and 2). The fence assembly 34 is thereupon positioned generally in the location of FIGS. 1, 1*a* and 2. If a straight cut is needed, the input and output fences (126 and 128) are aligned as shown in FIG. 4, and the fence assembly is pivoted about pivot 101 to displace the fences from the router bit 30 a distance equal to the cut to be made. The eccentric positions of gauge 110 is set to fix the maximum depth of cut. If it is desired to have the router blade remove a special layer of material from the work piece 130, the fences can be slidably offset from each other as shown in FIGS. 5 and 7 by loosening bar lock 100. Lock 94 (FIGS. 10 and 16) finally secure the assembly 34 in fixed relation to the table 12 and router bit 30

The micro-stop cam or gauge element 110 is moved to an eccentric position, as described above, which will provide the maximum depth of cut position of the infeed fence 124 and the outfeed fence 126. This depth of cut needs to be taken by a plurality of passes of the work piece past the router bit 30. After the cam gauge element 110 is locked so as to provide the maximum offset of the two fences 126 and 128, the releasable lock 94 (FIG. 16) is moved to its tightened position to lock the fence assembly 34 securely to the table. If the fences 124 and 126 are to be offset for a special cut, the lock 94 is tightened after the offset has been arranged. This is done by first loosening bar lock 100 as described above, sliding the plate 36 to its first incremental operating cutting position, and then retightening the lock 100. It is then that the lock 94 is tightened as described above (FIG. 16) so that the first pass of the work piece past the router blade can be made.

After the first pass is made, the bar lock 100 and the releasable lock 94 are loosened so that the plate 36 can be offset another increment of distance. The locks 94 and 102 are tightened again to permit a second pass of the work piece 128 to be made. This process is continued by incremental passes until the edge of plate 42 engages the cam wheel 112 which indicates that the maximum depth of cut on the work piece 130 (FIG. 7) has been achieved. When plates 124 and 126 are offset, cam gauge element 110 serves primarily to stabilize outfeed plate 42. When the fences 124 and 126 are aligned, cam gauge element 110 defines the maximum depth of cut position of the assembly 34.

When it is necessary to change router bits, the releasable lock 94 is removed as described above, as is the cam gauge element 110. The router fence assembly 34 is then rotated around pivot pin 101 to assume the position shown in FIG. 3. The router 28 is then pivoted to its upward position on section 20 as shown in FIG. 3 whereby the bit 30 can be easily removed and replaced with a bit of a different size.

This invention allows the user to make precise infinite cuts through a range of 0.003 to 0.125 thousandths of an inch. Parallelism is assured by the infeed fence 124 moving on an angled set of plates that are attached to the outfeed fence 126 as described. The two plates have zero tolerance internal slots that guarantee smooth operation.

The plates 36 and 42 and fences 124 and 126 are preferably made with a highly smooth material sold under the trademarks STARBOARD and SEATEAK to minimize frictional forces. The micro-stop cam 110 will allow the user to preset a final fence stop prior to the first cut. If a moulding cut required four pass cuts will be needed to complete the job, micro-stop cam 110 is preset to the last cut and locked with the knob 118. The fence is moved off the stop to the first pass after the lock 94 is locked. To continue, the lock knob 97 is loosened, and the above steps are repeated until the outfeed plate 42 makes contact with the cam wheel 112 for the final cut.

It is therefore seen that the device and method of use of his invention will achieve at least all of their stated objectives.

What is claimed is:

1. A router fence assembly, comprising, infeed and outfeed flat plates for positioning on a flat top router table adjacent a router bit opening, each of the plates having a straight elongated operating edge and adjacent parallel diagonal edges extending away from the operating edges at an angle thereto, a connecting mechanism slidably joining the plates at their diagonal edges to permit one plate to be slidably diagonally moved with respect to the other plate, and having a notch positioned adjacent to the router opening, a vertically disposed infeed fence secured to the straight edge of the infeed plate, a vertically disposed outlet fence secured to the straight edge of the outfeed plate, the fences having adjacent spaced inner ends and slots adapted to be located adjacent the router bit opening on a flat top router table, the connecting mechanism being operative to permit the movement of the fences and their inner ends from position of longitudinal alignment to a diagonally and laterally offset parallel position to permit an elongated workpiece slidably moved towards the router bit opening to engage a vertical rotating router bit extending upwardly therethrough to remove a portion of the workpiece equal to the lateral distance that the fences are separated, and a releasable lock element on one of said plates to permit the plates to be releasably locked in position with respect to each other.

2. The assembly of claim 1 wherein the connecting mechanism includes a pair of spaced parallel bars on the diagonal edge of one of the plates, with the bars having guide portions to slidably engage guide portions of complementary shape on the diagonal edge of the other plate to insure that the sliding of one plate with respect to the other is confined to a horizontal plane.

3. The assembly of claim 1 wherein a releasable gauge element is associated with one of plates to define the maximum desired slidable diagonal movement of one plate with respect to the other while permitting the releasable lock element to be functional to allow incremental movement of the plates with respect to each other up to the maximum desired laterally offset parallel position of the infeed and outfeed fences.

4. The assembly of claim 1 wherein a pivot element is located at one outer end of one of the plates to allow the router fence assembly to be horizontally pivotally connected to a flat top router assembly to effect movement of the assembly away from a router bit opening in the table.

5. The assembly of claim 4 wherein the releasable lock element is adapted to be fixedly received to a flat top router table and to extend through a slot in the table for selective locking engagement therewith for permitting incremental pivotal movement of the router fence assembly with respect to a router table to which the assembly is mounted.

* * * * *